Figure 3:
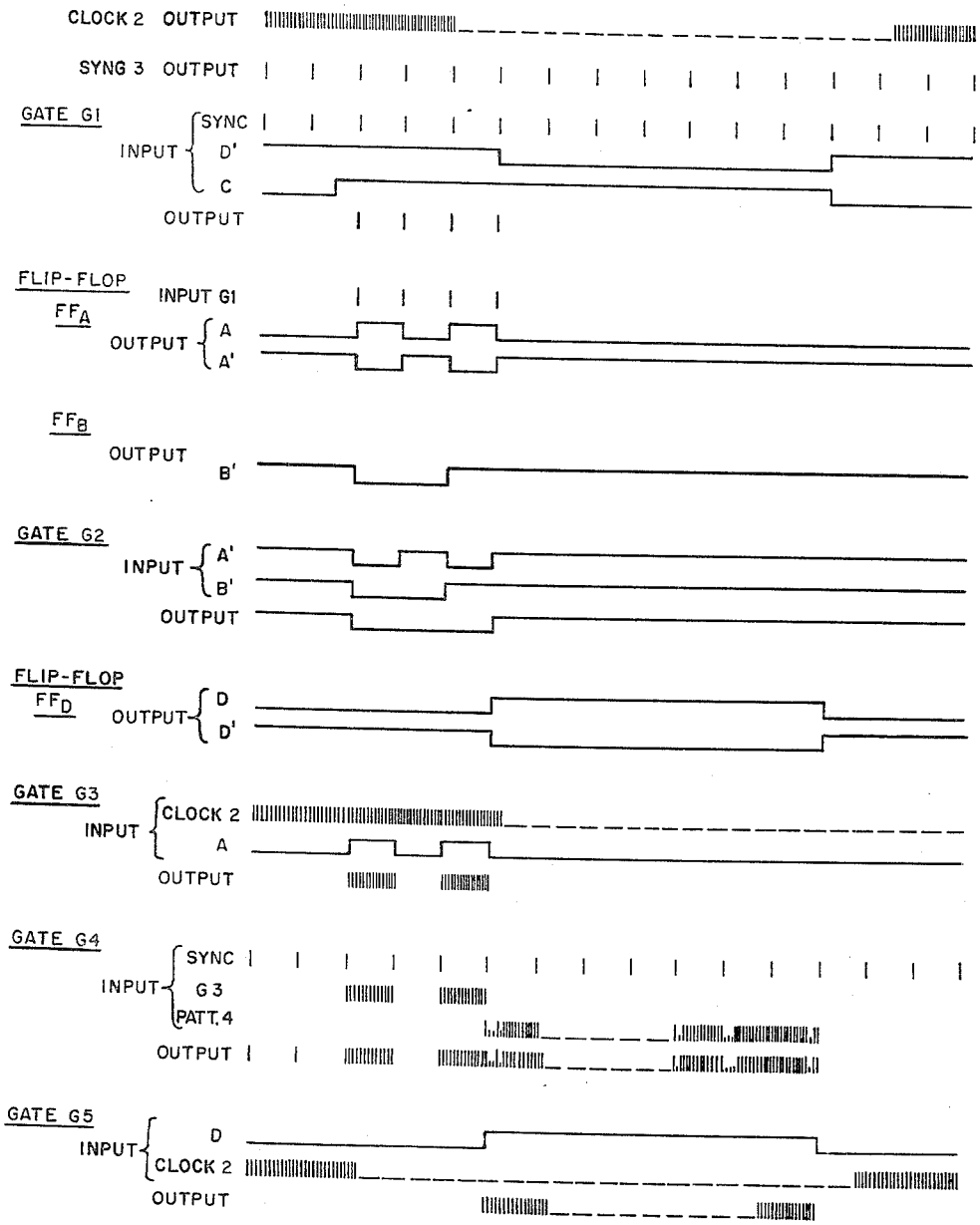

Dec. 18, 1962  R. J. FRANK  3,069,498
MEASURING CIRCUIT FOR DIGITAL TRANSMISSION SYSTEM
Filed Jan. 31, 1961  4 Sheets-Sheet 1
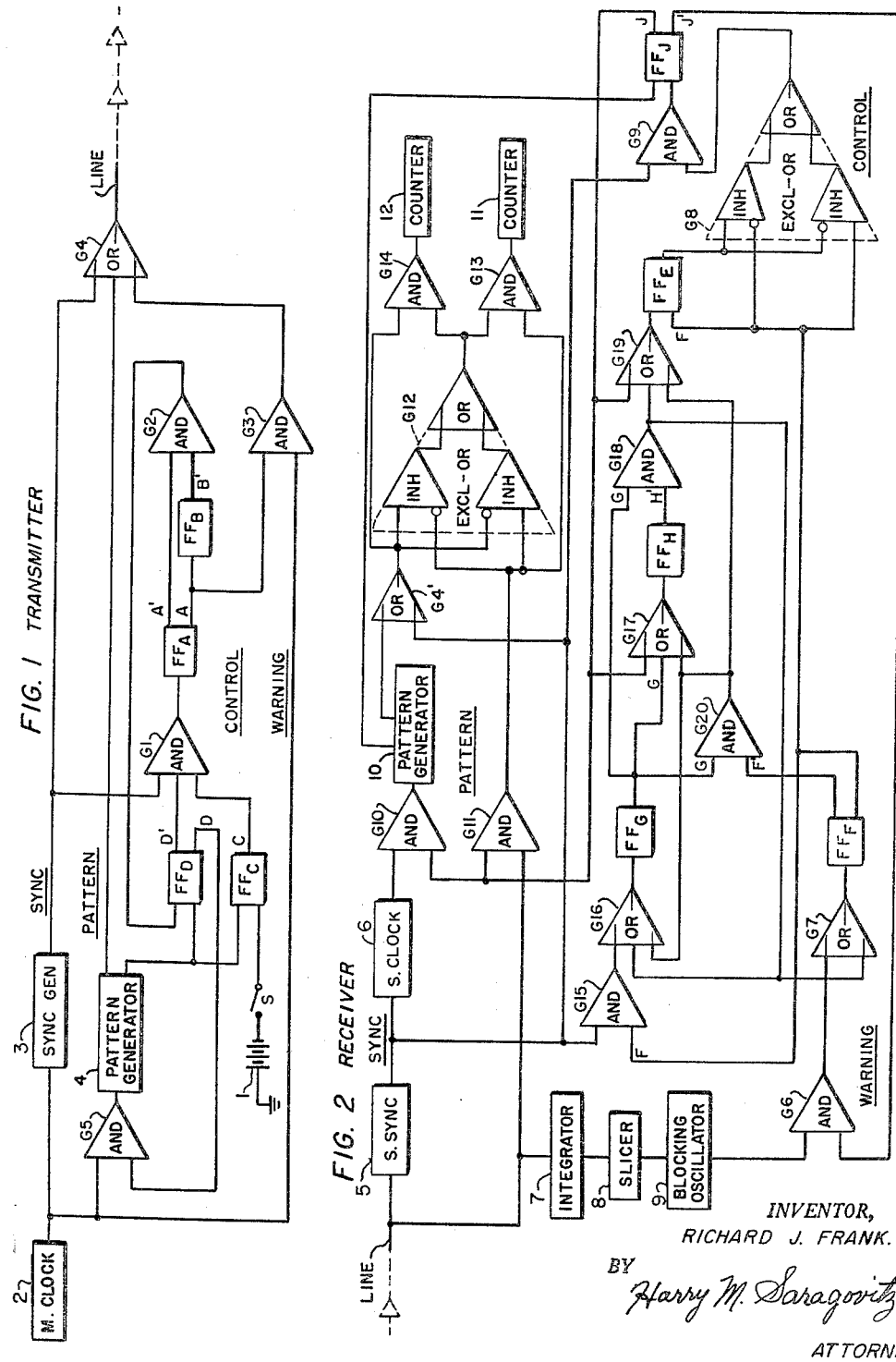
INVENTOR,
RICHARD J. FRANK.
BY Harry M. Saragovitz
ATTORNEY.

Dec. 18, 1962 R. J. FRANK 3,069,498
MEASURING CIRCUIT FOR DIGITAL TRANSMISSION SYSTEM
Filed Jan. 31, 1961 4 Sheets-Sheet 3

INVENTOR,
RICHARD J. FRANK.
BY Harry M. Saragovitz
ATTORNEY

Dec. 18, 1962  R. J. FRANK  3,069,498
MEASURING CIRCUIT FOR DIGITAL TRANSMISSION SYSTEM
Filed Jan. 31, 1961  4 Sheets-Sheet 4

*INVENTOR,*
*RICHARD J. FRANK.*
BY
*Harry M. Saragovitz*
ATTORNEY.

United States Patent Office 3,069,498
Patented Dec. 18, 1962

3,069,498
MEASURING CIRCUIT FOR DIGITAL TRANSMISSION SYSTEM
Richard J. Frank, North Plainfield, N.J., assignor to the United States of America as represented by the Secretary of the Army
Filed Jan. 31, 1961, Ser. No. 86,259
5 Claims. (Cl. 178—69)
(Granted under Title 35, U.S. Code (1952), sec. 266)

The invention described herein may be manufactured and used by or for the Government for governmental purposes, without the payment of any royalty thereon.

This invention relates to measuring circuits, and particularly to measuring circuits for use with a digital information transmission system for determining the distortion of the system resulting in errors in the transmitted information.

Distortion in the ordinary sense is of no consequence in such digital systems. In general, the property of a digital system is to process the information and not merely to transmit it from one place to another. For satisfactory operation it is sufficient to preserve the waveform of the transmitted signals only to the extent necessary to distinguish the discrete digital values being presented. When a signal is incorrectly interpreted or when a logical function is incorrectly performed in such a system, an error in the transmitted information may occur. A digital system is referred to as being highly reliable when it creates no signal errors over a long period of time. Incorrect performance may be due to non-conformity and instability of component parameters and signal interference from extraneous sources, which affect circuit operation. Even after a circuit has been designed to provide the highest degree of reliability obtainable, it can usually be expected that the parameters in some of the component circuits will drift sufficiently to cause errors in the transmitted signals. Ordinarily, it is desirable to detect the components that are causing marginal operation and to replace them before they have deteriorated to the condition where serious errors are caused. For that reason, it is desirable to have some circuit available for measuring the signal errors and for checking the operation of the digital system from time to time. The measuring circuit of the invention is particularly adapted for use with systems in which the digital information is to be transmitted between system terminals located relatively far apart. Also, it is particularly adapted for use with digital systems in which the wave pattern of the transmitted signal is relatively long and contains a random distribution of digital pulse components.

A general object of the invention is to measure accurately the distortion produced in digital information transmission systems with economical and efficient circuit apparatus.

A more specific object is to measure accurately the distortion in a digital transmission system causing errors in the transmitted digital signals comprising a relatively long pattern with a random distribution of pulse components therein and which are transmitted for long distances.

In accordance with the invention, to measure the distortion or errors produced by a transmission facility of the digital type on the transmitted signal pulses, prearranged identical wave patterns similar in nature to those of the normally transmitted digital signal information are separately generated at the transmitting and receiving terminals of the facility such as a wire line or wireless system, or a channel or group of channels of such a system. For simplicity the term "line" will be used hereafter for any such facility. The wave patterns generated at the transmitting terminal of the line are sent out thereover to the receiving terminal where they are compared with the wave patterns generated at that terminal and the errors counted to determine the distortion produced by the line. In order to make this measurement more accurate, a "start circuit" at the transmitter is used to generate a warning or synchronizing signal of comparatively simple wave pattern which is used to start the pattern generators at the two terminals of the line in synchronism. Transmission delays in the line are automatically compensated for, since the wave patterns generated at the transmitting terminal and the synchronizing signals are sent over the same channel.

More specifically, in the signals sent out from the transmitting terminal of the line, there are three basic components: (1) a sync component, involving master clock pulses divided to lower pulse repetition frequency (PRF); (2) a warning component, involving clock pulses transmitted in simple pattern groups; and (3) a pattern component, involving clock pulses transmitted in complex pattern groups. To control these components in proper sequence at the transmitter, the sync component may comprise uniformly spaced pulses, not interrupted, but the warning and pattern circuits include suitable gating devices under control of a sequence network which is itself controlled by the sync and pattern networks. The sequence network at the transmitter involves a plurality of bistable circuits, often called scale-of-two counters or flip-flops and associated AND gates which control and count the warning pulse groups, and then start the operation of the transmitter pattern generator to supply a signal comprising a single pattern to the line. At the end of each generated pattern, a final pulse is utilized to reset the first flip-flops in the network to the original starting condition.

In the receiver, the operation is somewhat reversed, including (1) detecting the received sync signals and multiplying them to provide slave clock pulses; (2) identifying the received warning signals and utilizing them to provide proper synchronization of the operation of the detector pattern generator based on the clock pulses; and (3) detecting the waveform patterns sent out from the transmitter, comparing them to the pattern signals generated by the detector pattern generator and counting the errors. In the receiver sequence network, the warning signals detected by an integrator, voltage slicer and a blocking oscillator may normally control a plurality of flip-flops and associated gates for counting the received warning signals and setting a flip-flop for gating out any further output of the integrator and for starting and stopping the receiver pattern generator to produce a pattern of pulses (of which the last pulse is used for resetting that flip-flop to the original starting condition) and transmitting the received pattern signals to the input of the comparator which comprises EXCLUSIVE-OR gates and associated binary counters.

The various objects and features of the invention will be better understood from the following detailed description when it is read in conjunction with the several figures of the accompanying drawings, in which:

FIGS. 1 and 2 show in block schematic form the arrangement of apparatus at the transmitter and receiver, respectively, of the measuring circuit embodying the invention; and FIGS. 3 to 6 show the waveforms generated at various points in the transmitter and receiver of the measuring circuit of the invention under different error signal conditions.

The apparatus in the transmitter of the measuring circuit of the invention located at the transmitting end of the line, as shown in FIG. 1, includes a starting switch S with an associated battery 1; a master clock 2; a sync generator 3; a pattern generator 4; a plurality of flip-flops $FF_A$, $FF_B$, $FF_C$ and $FF_D$; and a plurality of gating devices including the AND gates G1, G2, G3 and G5 and the OR gate G4. The conventional computer symbols for gates are used to simplify the drawing, in which input leads only to the edge of the gate symbol (large triangle) identify "AND" function, and leads thru the symbol identify "OR" function; leads indirectly to the edge (thru tiny semicircle) would identify an "INHIBIT" function. The apparatus in the receiver of the measuring circuit of the invention located at the receiving end of the line, as shown in FIG. 2, includes a slave synchronizing (sync) generator 5; a slave clock 6; an integrator 7; a slicer 8; a blocking oscillator 9; a pattern generator 10; a plurality of flip-flops $FF_E$, $FF_F$, $FF_G$, $FF_H$ and $FF_J$; and a plurality of gating devices including the AND gates, G6, G9, G10, G11, G13, G14, G15, G18 and G20, a plurality of OR gates G7, G16, G17, and G19 and the EXCLUSIVE-OR gates G8 and G12; and he binary counters 11 and 12. The EXCLUSIVE-OR gate circuits G8 and G12 are shown as groups of 2 INHIBIT and 1 OR gates with a dotted outline; this reveals typical actual logic and avoids a special symbol, which might also imply that an EXCLUSIVE-OR circuit is comparable in simplicity to its elementary component gates.

The pattern generators 4 and 10 in the transmitter and receiver, respectively, may comprise any suitable combination of flip-flops and gates which will produce a pulse train in which the pulse components statistically simulate the apparently random succession of pulses and spaces as in the digital information to be transmitted over the line. These signals may have either of two values having the significance of a "one" or a "zero." The one or zero signals may be represented physically in various ways, for example, one may be a positive voltage level and a zero a negative voltage level which are positive or negative with respect to one another but do not need to be positive or negative wih respect to a common ground. Thus, a one may be represented by the presence of a voltage pulse and a zero by the absence of a pulse at a specific time. Many forms of pattern generators are known, for example:

Loughren Patent No. 2,402,058 shows a pair of cathode-ray tube pattern generators used in a message scrambling and unscrambling system for providing substantial privacy in radio communication. The patentee refers to "random-frequency" apparently in the sense of a pseudo-random wave as in this application and furthermore repetitive at what would be called the "frame" frequency in a TV system. Such generators use familiar techniques, but usually must be built for each particular installation while simple, reliable, versatile, and readily available computers can be programmed to generate patterns of any desired complexity for similar purposes. In the present case a highly random pattern probably is not essential for testing the error rate of a channel and either type of pattern generator could be rather simple.

Briggs Patent No. 2,401,855 shows a pair of punched tape pattern generators for the same purpose. Briggs in FIG. 1B identifies the code by alphabet, Loughren by neither alphabet nor numbers, this paragraph before and after mention of Loughren by members; this is immaterial, merely a convenient manner of analysis.

One computer procedure suitable for rather simple analysis is to start with a first number of $n$ digits, square such number (giving $2n$ or $2n-1$ digits), use $n$ digits from the central portion as the second number, and repeat the same operation to get as many numbers as desired. Further analysis may show the elementary possibility of degeneration to all zeros (which might be avoided by merely adding a number each time), degeneration to a repetitive operation of too short a period for desired randomness, or more involved mathematical considerations as in "The Generation of Pseudo-Random Numbers on a Decimal Calculator," by Jack Moshman, page 88, Journal of the Association for Computing Machinery, April '54, Vol. 1, No. 2. When a generator follows a fixed rule a duplicate generator will follow the same rule and may easily be maintained in synchronism. If started with the same number both will generate the same series of numbers even though the numbers appear to be of random arrangement and the generators are located at widely separated points. Analysis from the computer standpoint appears to be most suitable since the details may be left to a computer engineer accustomed to flip-flops, gates, and alternative computer elements; other analyses may also apply to the same apparatus or possibly other apparatus but are not as widely known or as readily adaptable to different uses.

The master clock 2 may be any standard manufactured pulse generator or a blocking oscillator of conventional type which may employ vacuum tube or transistor devices, adapted to produce master clock pulses $r$ seconds apart. The sync generator or counter 3 to respond to each $n$ clock pulses may be made up of any suitable combination of stadard flip-flops, AND gates and OR gates, adapted under control of the master clock 2 to produce sync pulses which are $nr$ seconds apart, where $n=1, 2, 3, \ldots n$.

The slave sync generator 5 and the slave clock 6 may be any conventional circuits suitable for synchronizing one frequency source with another. Probably the best known slave synchronizing generators are used in television receiver horizontal and vertical sweep circuits, but do not normally use frequency multiplication since two types of synchronizing pulses are actually transmitted. Frequency division as in synchronizing generator 3 is used in the television transmitter to derive vertical and horizontal synchronizing from the same clock, and frequency multiplication as required in slave clock 6 involves merely the well-known reciprocal.

The flip-flop devices used at the transmitter and receiver of the measuring circuit as shown in FIGS. 1 and 2 may be any conventional bistable circuits, for example, bistable multivibrators, for performing the logical operation of remembering. Each of these devices has two possible states, the one and zero states, and can be flipped or flopped from one state to another by the application of short duration impulses, and remembers indefinitely the last state in which it has been thrown. In some cases a single input causes successive changes from either state to the other, common in flip-flops used in counting systems; in other cases one input can change only to one state and the other only to the other state, common in flip-flops used for control operations. They are broadly described in Par. 1.2 of Chapter 1 and illustrated in FIG. 1-2 of the book "Design of Transistorized Circuits for Digital Computers" by Pressman, published by John F. Rider of New York. They may be, for example, of the transistor type illustrated in FIGS 11-1 or 11-2 and described in Chapter 11 of that publication.

The AND gates, OR gates and binery counters used in the circuits of FIGS. 1 and 2 may be of the conventional type broadly described and illustrated in Pars. 1.3, 1.4 and 1.5 and FIGS. 1-5 to 1-8 of Chapter 1 of the above-identified Pressman publication and specifically illustrated and described on pp. 101, 103, 108, 296 and 298 thereof.

The EXCLUSIVE-OR gates G8 and G12 utilized in the receiver of FIG. 2 of this application may be of the type illustrated in FIG. 13-25 (a) or (b) employing a combination of OR and AND gates or an OR gate with one or two inhibitor devices, respectively, which are described on p. 411 of the book, "Pulse and Digital Circuits" by Millman and Taub, published by McGraw-Hill Book Co., Inc.

The integrator 7, voltage slicer 8, and blocking oscillator 9 may be of any of the conventional types.

Referring to the transmiter of FIG. 1, the sync pulses produced by the synchronizing generator 3 under control of the master clock 2 are transmitted at all times through the OR gate G4 to the line. The sync pulses produced by the synchronizing generator 3 are also normally supplied to one input of the AND gate G1.

A pattern of pulses is to be transmitted by the pattern generator 4 over the line. Before this is done, a warning signal of pulses is sent. The start circuit sends out this warning signal and then starts the pattern generator 4 working in the following manner.

The start circuit is activated by closing switch S to supply a voltage pulse from the battery 1 to the flip-flop $FF_C$ which sets it into the "one" position. This causes a one pulse to be applied over its output C to the lower input of the AND gate G1. The AND gate G1 has an output whenever there is a sync pulse from generator 3 on its input and as long as the D' input thereto is one and the C input thereto is one.

The first pulse applied from the output of gate G1 sets flip-flop $FF_A$ into the one position. The A output of flip-flop $FF_A$ sets the flip-flop $FF_B$ into the one position. It also applies a pulse from the output A to the upper input of the AND gate G3. This causes operation of the AND gate G3, because master clock pulses from the master clock 2 are normally applied to the other input thereof, so that master clock pulses are transmitted through the AND gate G3 and the OR gate G4 to the line. AND gate G2 does not have an output since the B' input thereto from the output of $FF_B$ is zero and the A' input thereto from the output of $FF_A$ is also zero.

The second pulse from the output of AND gate G1 resets the flip-flop $FF_A$ into the zero position so that the AND gate G3 stops operating. The conditions of flip-flop $FF_B$ and AND gate G2 remain unchanged since the B' input thereto is zero.

The third pulse from the output of AND gate G1 sets flip-flop $FF_A$ into the one position. The A output of flip-flop $FF_A$ resets flip-flop $FF_B$ into the zero position and operates AND gate G3 as before. The AND gate G2 still does not have an output since the A' input thereto is zero.

The fourth pulse from the output of AND gate G1 resets flip-flop $FF_A$ into the zero position causing AND gate G3 again to stop operating. The condition of flip-flop $FF_B$ remains unchanged. The combination of flip-flops may be regarded as a two-stage binary counter, $FF_A$ for units and $FF_B$ for twos, but the one and zero states as designated above correspond to a reverse order 0, 3, 2, 1, 0, 3, 2, 1, etc. Now, the A' and B' inputs to AND gate G2 are both one so that gate has an output which sets flip-flop $FF_D$ into the one position. The AND gate G1 will now have no output since the D' input thereto is zero. The D output of flip-flop $FF_D$ operates AND gate G5, since it is normally supplied with an input from the master clock 2, so that clock pulses are transmitted to the input of the pattern generator 4. The pattern generator 4 transmits a pattern of pulses through OR gate G4 to the line. It also sends the last pulse of the pattern to reset flip-flop $FF_D$ into the zero position and to reset flip-flop $FF_C$ into the zero position.

The circuit is now in its original condition and can be activated again by closing switch S. The waveforms produced at different points in the transmitter of FIG. 1 are shown in FIG. 3.

The receiver of FIG. 2 is used for the signal sent over the line by the "start circuit" in the manner which has just been described. The received sync signal is used to drive the slave synchronizing generator 5 so that its output is in phase with the received sync signals received over the line. The slave sync generator 5 drives the slave clock 6 so that its output is in phase with the slave sync signal.

When the warning signal activates the receiver, the pattern generator 10 starts operating exactly in phase with the slave sync signal. The received pattern of pulses is to be compared with the pattern pulses generated by the pattern generator 10 so that the errors in the received pattern may be counted.

*Detail operation of receiver circuit.*—When the receiver is to be activated, the warning signal of two periods of $n$ pulses separated by a period of $n$ spaces is sent out by the "start circuit" at the transmitter as previously described. The first group of $n$ pulses is integrated by the integrator 7 and the output voltage of the integrator is sliced by the slicer 8 to provide a voltage which triggers the blocking oscillator 9 which sends one pulse to the upper input of the AND gate G6. Since the $FF_J$ is normally set so that the J' input to AND gate G6 is one, an output pulse is obtained therefrom which goes through the OR gate G7 and sets the flip-flop $FF_F$ into the one position. The F output of flip-flop $FF_F$ set flip-flop $FF_E$ into the one position. The E output of flip-flop $FF_E$ goes to the upper input of the EXCLUSIVE-OR gate G8, but no output is obtained from gate G8 since both its inputs are one.

The F output also goes to the lower input of the AND gate G15, and then when the first slave sync pulse is applied to the other input thereof from the output of the slave synchronizing generator 5, an output is obtained from gate G15 which goes through OR gate G16 and sets the flip-flop $FF_G$ into the one position. The G output of flip-flop $FF_G$ goes through AND gate G17 and sets the flip-flop $FF_H$ into the one position and also goes to AND gate G18 and AND gate G20. No output is obtained from gate G20 since the F' input thereto is zero, and no output is obtained from gate G18 since its H' input is also zero. When the second slave sync pulse from the slave synchronizing generator 5 goes to the AND gate G15, the output of that gate resets flip-flop $FF_G$ through G16 into the zero position; therefore, gates G18 and G20 will still have no output.

Before the third slave sync pulse from generator 5 would go through AND gate G15, the second group of $nr$ warning pulses sent by the "start circuit" will trigger the blocking oscillator 9 as described previously and the output pulse will go to the flip-flop $FF_F$ as before, but will reset into the zero position. The F' input to gate G20 is now one but no output will be obtained therefrom since its G input is zero.

The EXCLUSIVE-OR gate G8 will now have an output since its F input thereto from flip-flop $FF_F$ is zero and the E input from the output of the flop-flop $FF_E$ is one. The output of EXCLUSIVE-OR gate G8 operates AND gate G9 whenever a wave sync pulse is applied thereto from the slave synchronizing generator 5. The first pulse from the output of gate G9 will set flip-flop $FF_J$ into the one position causing the J' output thereof to gate G6 to be zero, and therefore no further output will be obtained from this gate; thus, the received pattern of pulses will have no effect upon gate G6. The J output of flip-flop $FF_J$ operates AND gate G10 so that the slave clock SC pulses are sent to the input of the pattern generator 10. The J output of flip-flop FFJ also resets flip-flop $FF_E$ into the zero position through the OR gate G19, resets flip-flop $FF_H$ into the zero position through OR gate G17, and allows the received signal to flow through the AND gate G11.

The pattern generator 10 sends the pattern of pulses to the EXCLUSIVE-OR gate G12 and AND gate G14. The EXCLUSIVE-OR gate G12 compares this pattern and the received pattern so that an output is obtained whenever the received signal contains errors caused by the transmission facility. When the error is a pulse changed from zero to one, an output is obtained from AND gate G13 which is counted by the binary counter 11. When the error is a pulse changed from one to zero, an output is obtained from AND gate G14 which is counted by binary counter 12.

Figure 4:
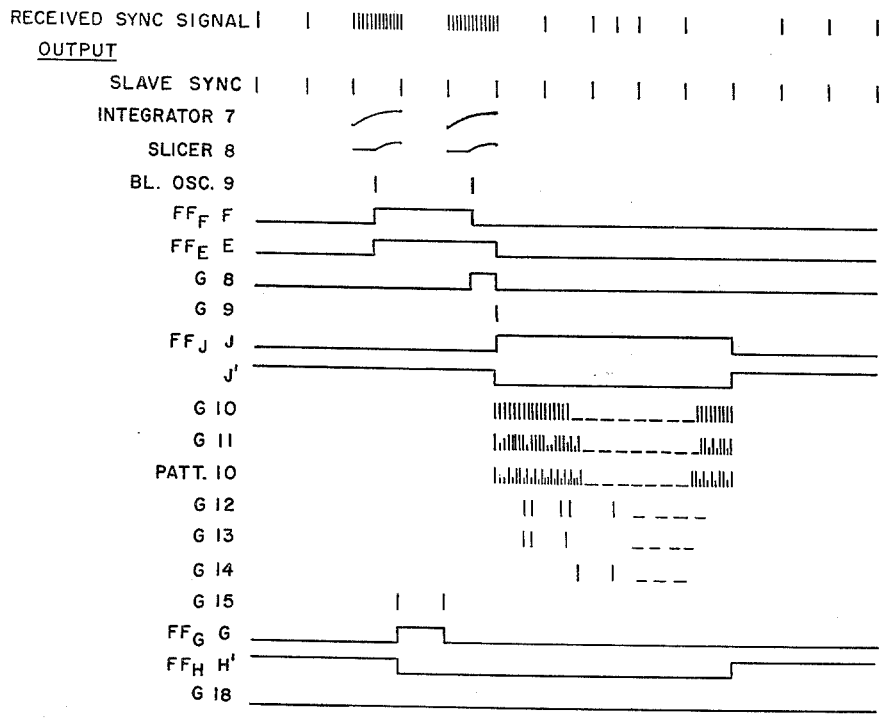

The pattern generator 10 also sends the last pulse of the pattern to reset flip-flop FF$_J$ into the zero position. The circuit is now in its original condition and can be activated again by receiving the proper warning signal. The waveforms produced at different points in the receiver of FIG. 2 are shown in FIG. 4.

Provision is made so that the receiver circuit will ignore error signals that look similar to the warning signal received from the "start circuit." For example, suppose that error pulses due to the line almost fill the $nr$ period between two sync pulses. If the signal does not look very similar to the real warning signal, the integrated voltage will not be large enough to trigger the blocking oscillator 9 and thus will be ignored by the receiver. If it is very similar, the blocking oscillator 9 will be triggered and will send out a pulse and the circuit will operate as described above. In this case, where the received signal is an error signal, a third sync pulse will go through AND gate G15 since there will be no second group of $nr$ pulses received by the receiver. This pulse will set flip-flop FF$_G$ through gate G16 into the one position. The G output of flip-flop FF$_G$ will reset flip-flop FF$_H$ through G17 into the zero position but will not operate gate G20 since its F' input is zero. The H' output of flip-flop FF$_H$ will operate AND gate G18 since its G input is one. The output of this gate will reset flip-flops FF$_E$, FF$_F$ and FF$_G$ into the zero position through OR gates G19, G7 and G16, respectively, and thus the circuit ignores the error signal and is in its original condition ready to be activated by receiving the proper warning signal.

Figure 5:
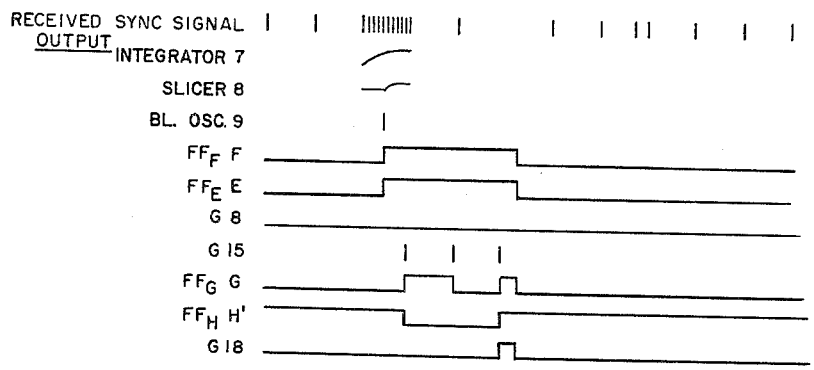
Figure 6:
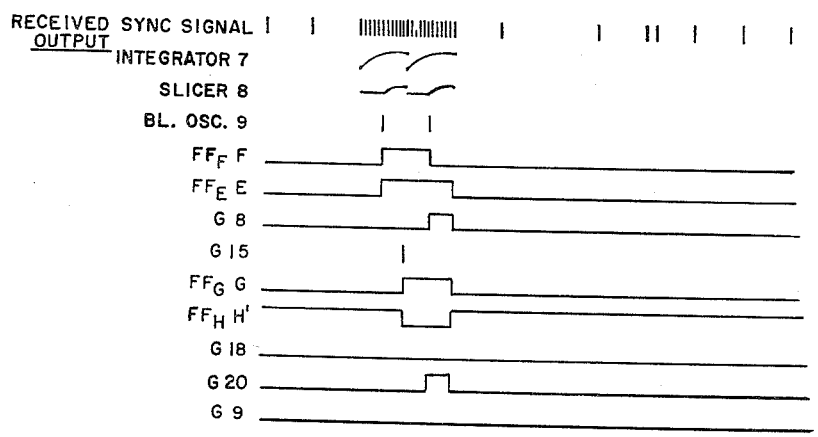

Suppose that another type of error signal is received. This signal may be one where error pulses due to the line almost fills two consecutive $nr$ periods between the sync pulses. If the error signal is very similar to the proper start signal, the blocking oscillator 9 will be triggered during both $nr$ periods. The first pulse sent out from the blocking oscillator 9 will cause the detector to operate as described above. In this particular case the blocking oscillator will be triggered and will send out a second pulse before the second slave sync pulse goes through AND gate G15. This second blocking oscillator pulse will reset flip-flop FF$_F$ into the zero position. Flip-flop FF$_E$ will not be affected and so the EXCLUSIVE-OR gate G8 will have an output (temporarily). The F' output of flip-flop FF$_F$ will operate AND gate G20 since its G input is one. The output of gate G20 will reset flip-flops FF$_F$, FF$_G$ and FF$_H$ into the zero position through OR gates G19, G16 and G17, respectively. There will be no output from the EXCLUSIVE-OR gate G8. The gate G9 has no output because the gate G8 output stops before a slave sync pulse arrives at gate G9; and thus the circuit has ignored the error signal, and is now in its original condition ready to be activated by the proper warning signal. The waveforms produced at different points in the receiver of FIG. 3 for the above three error signal conditions are shown in FIGS. 5, 6 and 7, respectively.

Any other arrangements of flip-flops and gating devices which will produce the control effects at the transmitting and receiving terminals of the measuring circuit of the invention obtained by the arrangements illustrated and described may be used. Various other modifications of the circuit arrangement illustrated and described, which are within the spirit and scope of the invention, will occur to persons skilled in the art.

What is claimed is:

1. A circuit for measuring the distortion in a transmission facility for transmitting between transmitting and receiving terminals thereof digital information in the form of repeated equal-length wave patterns of digital pulse components of random distribution within the pattern, said circuit comprising at the transmitting terminal master clock means for generating a series of clock pulses at uniformly spaced intervals $r$ seconds apart; a pulse generator for producing under control of a portion of the generated clock pulses a sync signal comprising a series of uniformly spaced pulses $nr$ seconds apart which are supplied at all times to said facility for transmission thereover; a pattern generator which, when operated, produces a pattern of wave pulses in which the percentage of pulses and spaces is similar to that of the digital information sent over said facility; a starting switch; switching means actuated by closing said starting switch for causing a portion of the clock pulses generated by said master clock means to be sent out over said facility to the receiving terminal as a warning signal, subsequently to start the pattern generator working for a sufficient interval to send out one complete pattern signal; stopping said generator at the conclusion of the transmitted pattern signal and resetting the said switching means so that it is in the original condition to be responsive to the next operation of said starting switch; and at the receiving terminal of said facility a receiver pattern generator which, when operated, produces a pattern of pulses identical with that generated by the pattern generator at the transmitting terminal; means responsive to the received sync signal to produce slave pulses in phase therewith; means for utilizing the warning signal pulses to start operation of said receiver pattern generator exactly in phase with the received pattern signals based on said slave pulses; means for comparing the output of the receiver pattern generator with the received pattern signal; and binary counter means responsive to the output of the comparison means for counting the errors in the received pattern signal.

2. In combination with a transmission facility for transmitting digital information in the form of repeated patterns of the same length but respectively containing random arrangements of the digital pulse components, a distortion measuring circuit comprising at the transmitting terminal of said facility master clock means for generating a series of master clock pulses at equal intervals $r$ seconds apart; a pulse generator for producing under control of the generated clock pulses a sync signal comprising a series of uniformly spaced pulses $nr$ seconds apart, where $n=1, 2, 3, \ldots n$, which is supplied at all times to said facility for transmission thereover to the receiving terminal; a starting switch; a pattern generator which, when operated, produces a random pattern of wave pulses similar in percentage of pulses and spaces to that of the digital information normally sent over said facility; switching means responsive to operation of said switch to the closed position to first transmit a portion of the clock pulse output of said master clock as a warning signal to said facility for transmission thereover to the receiving terminal, then to start the operation of said pattern generator so that it supplies its wave pattern signal to the facility and then stop operation of said generator at the conclusion of the pattern and to transmit a final pulse to said switching means to reset it to the original condition in which it can be operated to repeat this cycle of control operations by again operating said starting switch to the closed condition; and at the receiving terminal, a receiver pattern generator which, when operated, produces a simulated pattern of pulses identical with that produced by the pattern generator at the transmitting terminal; means responsive to the received sync signal to provide slave clock pulses which are in phase with the received sync signal; means for utilizing the received warning signals and said slave clock pulses to start operation of the receiver pattern generator exactly in phase with the received pattern signals; means for comparing the received pattern signal with the output of the receiver pattern generator to detect errors in the received pattern signal; and binary counter means for counting said errors.

3. The measuring circuit of claim 1, in which the distortion measuring circuit includes at said transmitting terminal a first OR gate connecting the output of the sync pulse generator thereat to the input of the transmission facility so that the sync signal is sent out through that gate over the facility to the receiving terminal thereof whenever that generator is rendered operated by said master clock means, the output of said master clock means is connected to the transmission facility through a normally-inoperative first AND gate and said first OR gate, said switching means at said transmitting terminal comprises a sequence network including a plurality of flip-flops and associated AND gates, which is responsive to each operation of said starting switch to first render said first AND gate operative to allow said series of master clock pulses forming the warning signal to be transmitted therethrough and said first OR gate to said facility, and subsequently to start and stop operation of the pattern generator at the transmitting terminal so that it transmits a signal comprising one wave pattern through said first OR gate following the warning signal to said facility, and to apply a final pulse at the end of the transmitted pattern signal to reset the first flip-flop in said sequence network to the original condition so that it may be reoperated by again closing the starting switch.

4. The measuring circuit of claim 1, in which the distortion measuring circuit includes at the receiving terminal of said facility a slave sync generator driven by the received sync signal so that its output is in phase with that signal, a slave clock driven by the slave sync generator so as to provide slave clock pulses in phase with the pulses in the slave sync signal, an integrator for integrating the received master clock pulses comprising the warning signal, means for slicing the voltage output of said integrator, a blocking oscillator operatively triggered by the output of said voltage slicing means, a receiving sequence network comprising a plurality of other flip-flops and associated other AND, OR and EXCLUSIVE-OR gates controlled by the output of said blocking oscillator and the slave clock pulses produced by said slave clock to start and stop operation of said detector pattern generator exactly in phase with the received pattern signals, and said means for comparing the signal output of said detector pattern generator with the received pattern signal comprises another EXCLUSIVE-OR gate having two inputs respectively supplied with these signals and a single output circuit for producing an error signal representing in amount and direction the error produced in the received pattern signal, and binary counters connected to the output of said EXCLUSIVE-OR gate for respectively counting the errors of different directions.

5. The measuring circuit of claim 1, in which said detecting means at said receiving terminal includes an integrator for integrating a portion of the master clock pulses comprising the warning signal received from the transmitting terminal, means for slicing the output voltage of said integrator, a blocking oscillator triggered by the output of said voltage slicing means to produce an output pulse which causes said other switching means to start and stop operation of said detector pattern generator in synchronism with the received pattern signal, and means in said other switching means for gating out any further output of said integrator during the switching interval.

References Cited in the file of this patent
UNITED STATES PATENTS
2,581,961    Lake _____ Jan. 8, 1952